United States Patent [19]
Keppel

[11] 3,831,974
[45] Aug. 27, 1974

[54] PASSIVE RESTRAINT BELT ARRANGEMENT FOR A VEHICLE OCCUPANT

[75] Inventor: Charles M. Keppel, Holly, Mich.
[73] Assignee: General Motors Corporation, Detroit, Mich.
[22] Filed: June 1, 1973
[21] Appl. No.: 366,169

[52] U.S. Cl............................................ 280/150 SB
[51] Int. Cl................................................ B60r 21/02
[58] Field of Search............. 280/150 SB; 180/82 C

[56] References Cited
UNITED STATES PATENTS

| | | | |
|---|---|---|---|
| 3,680,883 | 8/1972 | Keppel | 280/150 SB |
| 3,684,310 | 8/1972 | Weststrate | 280/150 SB |
| 3,754,776 | 8/1973 | Cataldo | 280/150 SB |
| 3,770,294 | 11/1973 | Hammer | 280/150 SB |

Primary Examiner—Robert R. Song
Attorney, Agent, or Firm—J. A. Kushman

[57] ABSTRACT

A vehicle body occupant restraint belt arrangement in which a restraint belt has one end secured to the lower rearward portion of a vehicle door and has its other end secured to the vehicle roof rearward and outboard of a seat adjacent the door. A control member is slidable along the intermediate portion of the restraint belt and attaches one end of a control belt whose other end is received by a vehicle sensitive inertia locking belt retractor positioned inboard of the seat adjacent a lower rearward seat portion. The retractor normally retracts the control belt to pull the control member inward and thereby defines the restraint belt into lap and shoulder belt portions positioned across a seated occupant in a restraining position when the vehicle door is closed. A guide along the upper edge of the door opening mounts a slide member that is movable forwardly and rearwardly by a drive mechanism responsive to an operative condition of the vehicle. The drive mechanism moves the slide member rearwardly when the vehicle is placed in this operative condition so that the belt arrangement moves without any deliberate occupant effort to the restraining position when the door is closed. When the vehicle ceases to be in this operation condition, the drive mechanism moves the slide member forwardly and moves the restraint belt to a generally forwardly pointing easyenter position so as to free the occupant. Door opening movement then moves the lower portion of the restraint belt to an outwardly extending inclined configuration so that the control member slides upwardly on this belt portion and lifts the control belt to afford an occupant convenient egress from or ingress to the vehicle body free of the belt arrangement.

2 Claims, 1 Drawing Figure

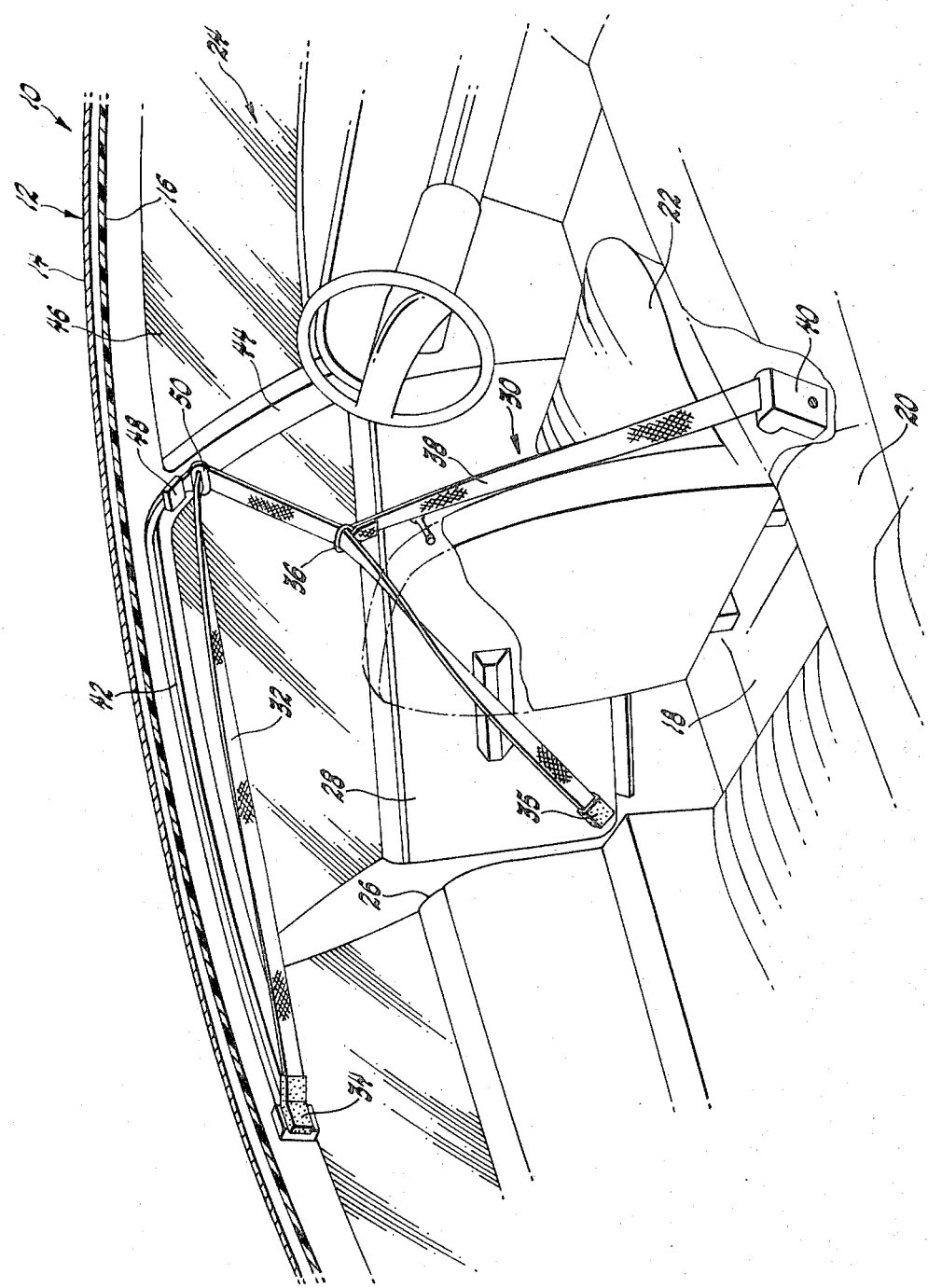

PASSIVE RESTRAINT BELT ARRANGEMENT FOR A VEHICLE OCCUPANT

BACKGROUND OF THE INVENTION

This invention relates generally to passive belt arrangements that are movable between occupant restraining and easy-enter positions without any deliberant occupant effort.

Belt arrangements movable between occupant restraining and easy-enter positions without any deliberate occupant effort are known. My U.S. Pat. No. 3,680,883 Keppel et al, U.S. Pat. No. 3,684,310 Weststrate, U.S. Pat. No. 3,690,696 Lincoln, U.S. Pat. No. 3,694,002 Fancy, and U.S. Pat. No. 3,700,258 Wize disclose belt arrangements of this type.

SUMMARY OF THE INVENTION

The passive belt arrangement of this invention includes a restraint belt with one end secured to a lower rearward portion of a vehicle door and the other end secured to the vehicle roof rearward and at the outboard side of a vehicle seat laterally adjacent the door. A control member slidably receives an intermediate portion of the restraint belt and attaches one end of a control belt whose other end is received by a vehicle sensitive inertia locking belt retractor mounted inboard of the seat. The retracting bias of the belt retractor normally pulls the control member in an inboard direction to define the restraint belt into lap and shoulder belt portions for restraining a seated occupant. A roof mounted guide along the upper edge of the door opening mounts a slide member movable forwardly and rearwardly by a drive mechanism that is responsive to an operative condition of the vehicle. The slide member slidably receives the restraint belt between the control member and the end of the belt attached to the roof and is moved rearwardly by the drive mechanism when the vehicle is placed in the operative condition so that the belt retractor retracts the control belt and moves the belt arrangement from an easy-enter position to an occupant restraining position without any deliberate occupant effort. The slide member is moved forwardly by the drive mechanism when the vehicle ceases to be in the operative condition so that the restraint belt moves to a forwardly pointing easy-enter position and extends the control belt from the belt retractor as the control member moves with the restraint belt. Upon opening movement of the door with the restraint belt in this easy-enter position, the lower portion of the restraint belt moves to an outwardly extending inclined configuration that causes the control member to slide upwardly on this belt portion and lift the extended control belt in a manner that further frees an occupant during ingress to and egress from the vehicle.

BRIEF DESCRIPTION OF THE DRAWINGS

The objects, features and advantages of the present belt arrangement are readily apparent from the following detailed description of the preferred embodiment and the single FIGURE of the drawing which shows a vehicle body utilizing a belt arrangement according to this invention shown in an easy-enter position with the vehicle door in open position.

DETAILED DESCRIPTION OF THE PREFERRED EMBODIMENT

Referring to the drawing, a vehicle body indicated by 10 includes a vehicle roof 12 consisting of a roof panel 14 and a headliner 16, a vehicle floor 18 including a transmission tunnel 20, and a front seat 22 mounted on the floor 18 within the vehicle occupant compartment which is generally indicated by 24. Access to seat 22 is through a side door opening 26 which is selectively opened and closed by a door 28 whose forward edge is hinged to the vehicle body for swinging movement about a generally vertical axis in a conventional manner.

A passive belt arrangement, according to this invention, is utilized with the vehicle body and is generally indicated by 30. This belt arrangement includes a restraint belt 32 whose upper end is fixedly secured in a suitable manner to the outboard edge of the roof rearward of seat 22 and is covered by a plastic trim boot 34. The lower end of restraint belt 32 is secured to a lower rearward portion of the vehicle door and is covered by a plastic trim boot indicated by 35. Intermediate the ends of the restraint belt, an apertured control member 36 slidably receives the restraint belt and attaches one end of a control belt indicated by 38. The other end of the control belt is received by a belt retractor 40 that is mounted inboard of the seat on the transmission tunnel 20 adjacent a lower rearward portion of the seat. Preferably, this belt retractor is a vehicle inertia sensitive type retractor whose locking is actuated in response to abrupt changes in the rate of vehicle movement by movement of an inertia member such as a pendulum. It is also possible for this retractor to be of the belt reel sensing type in which locking is actuated in response to abrupt extension of the belt from the retractor. Whichever type of retractor is utilized, it nevertheless must provide a constant retracting bias to the control belt 38 so as to normally urge the control member 36 in an inboard direction with respect to the vehicle.

Along the upper edge of door opening 26, the roof 12 includes a suitable guide 42 that extends between the attachment of restraint belt 32 to the roof and the windshield pillar 44 laterally adjacent the windshield 46. This guide slidably supports a slide member 48 which includes an apertured ear 50 slidably receiving the restraint belt 32 between the control member 36 and the boot 34. A suitable drive mechanism, not shown, is attached to slide member 48 so as to move this member longitudinally with respect to the vehicle. The drive mechanism may be similar to the one disclosed by my copending application Keppel et al Ser. No. 156,808, filed on June 25, 1971 and assigned to the assignee of the present invention, and is responsive to an operative condition of the vehicle which may be vehicle ignition, placement of the transmission selector control in a driving position after ignition, the locked or unlocked condition of the door lock associated with door 28, or any other desired condition.

When the vehicle is placed in the operative condition with the door 28 in closed position, the drive mechanism moves slide member 48 rearwardly to adjacent boot 34 so that the control belt 38 is free to be retracted by the retracting bias of belt retractor 40. This retraction moves the control member 36 inboard toward retractor 40 and defines the restraint belt 32 into lap and shoulder belt portions that assume an occupant restraining position with respect to a seated occupant without any deliberate effort on the occupant's part.

When the vehicle ceases to be in the operative condition, the drive mechanism moves the slide member 48 forwardly as the restraint belt 32 slides through it and moves to a generally forwardly pointing easy-enter position free of the occupant. This belt movement moves control member 36 in an outboard direction and thereby extends the control belt 38 from belt retractor 40 against the retracting bias of the retractor. As the door 28 is subsequently opened, the lower portion of the restraint belt moves to the outwardly extending inclined configuration shown. The inward pull on control member 36, either due to the retracting bias of belt retractor 40 or due to the control belt 38 reaching its limit of extension from the belt retractor, causes the control member to slide upwardly on this inclined portion of the restraint belt. The upward sliding of the control member 36 lifts the control belt 38 and further frees a vehicle occupant for egress from or ingress to the seat 22 with the door opened. Therefore when an occupant does enter the vehicle with the belt arrangement in this easy-enter position, subsequent placement of the vehicle in its operative condition will again move the belt arrangement to the occupant restraining position without deliberate occupant effort.

It is believed evident from the foregoing description that this invention provides an improved passive restraint belt arrangement for a vehicle occupant.

What is claimed is:

1. In a vehicle body including a roof and a floor defining an occupant compartment, a seat mounted on the floor within the compartment and a door movable about the forward edge thereof between open and closed positions with respect to a side door opening adjacent the seat, a passive restraint belt arrangement for a seated occupant comprising, a restraint belt with one end secured to a lower rearward portion of the door and with its other end secured to the roof rearward of the seat at the outboard side thereof, a control member slidable along the intermediate portion of the restraint belt, a control belt with one end attached to the control member, a belt retractor mounted at the inboard side of the seat adjacent a lower rearward portion thereof and receiving the other end of the control belt so that the retracting bias of the retractor normally pulls the control member in an inboard direction and thereby defines the restraint belt into lap and shoulder belt portions, a roof mounted guide along the upper edge of the door opening, a slide member slidably mounted on the guide and slidably receiving the restraint belt between the control member and the attachment of this belt to the roof, and drive means for moving the slide member rearwardly along the guide in response to an operative condition of the vehicle so that the belt retractor retracts the control belt and pulls the control member inboard to a position locating the lap and shoulder belt portions of the restraint belt across a seated occupant in a restraining position without deliberate occupant effort when the door is closed, the drive means moving the slide member forwardly upon cessation of the operative condition of the vehicle so that the restraint belt thereby assumes a generally forwardly pointing easy-enter position and pulls the control member outboard to extend the control belt from the belt retractor, and a lower portion of the restraint belt swinging to an outwardly inclined configuration as the door is opened with the restraint belt in easy-enter position so that the control member slides upwardly on this belt portion and thereby lifts the extended control belt to position the belt arrangement in an easy-enter position allowing convenient occupant egrees from or ingress to the vehicle body.

2. In a vehicle body including a roof and a floor defining an occupant compartment, a seat mounted on the floor within the compartment and a door movable about the forward edge thereof between open and closed positions with respect to a side door opening adjacent the seat, a passive restraint belt arrangement for a seated occupant comprising, a restraint belt with one end fixedly secured to a lower rearward portion of the door and with its other end fixedly secured to the roof rearward of the seat at the outboard side thereof, an apertured control member slidably receiving the intermediate portion of the restraint belt, a control belt with one end attached to the apertured control member, a vehicle inertia sensitive type belt retractor mounted at the inboard side of the seat adjacent a lower rearward portion thereof and receiving the other end of the control belt so that the retracting bias of the retractor normally pulls the apertured control member in an inboard direction and thereby defines the restraint belt into lap and shoulder belt portions, a roof mounted guide along the upper edge of the door opening, a slide member slidably mounted on the guide and slidably receiving the restraint belt between the control member and the fixed attachment of this belt to the roof, and drive means for moving the slide member rearwardly along the guide in response to an operative condition of the vehicle so that the belt retractor retracts the control belt and pulls the control member inboard to a position locating the lap and shoulder belt portions of the restraint belt across a seated occupant in a restraining position without deliberate occupant effort when the door is closed, the drive means moving the slide member forwardly upon cessation of the operative condition of the vehicle so that the restraint belt assumes a generally forwardly pointing easy-enter position and pulls the control member outboard to extend the control belt from the belt retractor, and the lower portion of the restraint belt moving to an outwardly inclined configuration as the door is opened with the restraint belt in easy-enter position so that the control member slides upwardly on this belt portion due to its inclined configuration and thereby lifts the extended control belt to position the belt arrangement in an easy-enter position allowing convenient occupant egress from or ingress to a vehicle body.

* * * * *